United States Patent [19]

Capurka

[11] Patent Number: 5,748,620
[45] Date of Patent: May 5, 1998

[54] METHOD FOR PROVIDING COMMUNICATIONS TO A COMMUNICATION DEVICE IN A RADIO COMMUNICATION SYSTEM

[75] Inventor: Tomas Capurka, Palatine, Ill.

[73] Assignee: Motorola, Inc., Schaumburg, Ill.

[21] Appl. No.: 640,291

[22] Filed: Apr. 30, 1996

[51] Int. Cl.$^6$ .............................. H04Q 7/34; H04Q 7/36
[52] U.S. Cl. .................... 370/328; 455/433; 455/435
[58] Field of Search ....................... 340/825.44, 825.49; 370/328, 338, 340; 455/432, 433, 435, 440, 31.3

[56] References Cited

U.S. PATENT DOCUMENTS

| 5,606,596 | 2/1997 | Jain et al. | 455/433 |
| 5,642,398 | 6/1997 | Tiedemann, Jr. et al. | 455/435 |
| 5,649,286 | 7/1997 | Frerking | 455/435 |

OTHER PUBLICATIONS

U. Madhow, "Power and bandwidth optimization for personal communications mobility tracking," 1994 IEEE International Symposium on Information Theory (Cat. No. 94CH3467-8) p. 231, Aug. 1994.

H. Jung et al., "Efficient Location Management in PCS," Sixth IEEE International Symposium on Personal, Indoor and Mobile Radio Communications. PIMRC'95. Wireless: Merging onto the Information Superhighway (Cat. No. 95TH8135) pp. 284–288, vol. 1, Jan. 1995.

K. Kim et al., "Analysis of Power Up and Down Registration in CMS (CDMA Mobile Systems)," 1995 Fourth IEEE International Conference on Universal Personal Communications. Record. Gateway to the 21st Century (Cat. No. 95TH8128) pp. 329–333, Apr. 1995.

U. Madhow et al., "Optimization of Wireless Resources for Personal Communications Mobility Tracking," IEEE/ACM Transactions on Networking, vol. 3, Issue 6, pp. 698–707, Dec. 1995.

S.J. Kim et al., "Modeling and Analysis of the Dynamic Location Registration and Paging in Microcellular Systems," Transactions on Vehicular Technology, vol. 45, Issue 1, pp. 82–90, Feb. 1996.

Primary Examiner—Melvin Marcelo
Attorney, Agent, or Firm—Daniel C. Crilly

[57] ABSTRACT

A communication system (100) employs a method for providing communications to a communication device (e.g., 120) located in the communication system. The communication device (120) transmits a registration message to a system controller (101) via a first base site (104). The system controller then affiliates the communication device with the first base site and a location area (150) that includes a service coverage area (134) of the first base site. When the system controller receives a communication (e.g., a packet data communication) for the communication device, the system controller determines whether the communication was received within a predetermined period of time after a previous communication involving the communication device. When the communication was received within this period of time, the system controller transmits at least a portion of the communication to the communication device via the first base site; otherwise, the system controller pages the communication device via the base sites (103–106) serving the location area.

30 Claims, 7 Drawing Sheets

FIG.2

| COMMUNICATION DEVICE | COMMUNICATION DELIVERY STATUS | LOCATION AREA | BASE SITE RECEIVING REGISTRATION | |
|---|---|---|---|---|
| 120 | PAGE | 150 | 104 | ← 201 |
| 121 | PAGE | 151 | 107 | |
| 122 | PAGE | 151 | 108 | |
| 123 | PAGE | 151 | 109 | |

| COMMUNICATION DEVICE | COMMUNICATION DELIVERY STATUS | LOCATION AREA | BASE SITE RECEIVING REGISTRATION | |
|---|---|---|---|---|
| 120 | TRANSMIT | 150 | 104 | ← 301 |
| 121 | PAGE | 150 | 105 | ← 302 |
| 122 | TRANSMIT | 152 | 110 | ← 303 |
| 123 | PAGE | 151 | 109 | ← 304 |

METHOD FOR PROVIDING COMMUNICATIONS TO A COMMUNICATION DEVICE IN A RADIO COMMUNICATION SYSTEM

FIELD OF THE INVENTION

The present invention relates generally to radio communication systems and, in particular, to providing communications to a communication device in a radio communication system.

BACKGROUND OF THE INVENTION

Radio communication systems, such as trunked radio systems or cellular systems, are known to include a system controller, a plurality of base sites, and a plurality of communication devices, such as mobile radios, portable radios, or radiotelephones. Each base site serves a corresponding service coverage area and typically provides at least one traffic channel and a control channel to communication devices located within its service coverage area. The traffic channels are utilized to convey information between communication devices or between communication devices and public switched telephone network (PSTN) subscribers. The control channel is used to convey system information between the communication devices and a particular base site.

During a typical communication, a communication device moves throughout service coverage areas of the system. The movement of the communication device requires the system controller to track the location of the communication device within the system to enable the system controller to alert the communication device when a call involving the communication device is received at the system controller. That is, the system controller must know approximately where the communication device is located in order to assign an appropriate base site to support a communication for the communication device.

One known approach to tracking communication device movement is known as the coverage area update approach. The coverage area update approach requires a communication device to report, or register, each time the communication device enters a different service coverage area. The communication device monitors the system control channel to obtain, inter alia, the identification of the base site serving the coverage area containing the communication device. Upon observing a change in the base site identification on the control channel, the communication device transmits an inbound message on the control channel to register with the system controller in the new service coverage area. Therefore, when a communication arrives at the system controller for a particular communication device, the system controller simply transmits the communication to the communication device via the base site serving the service coverage area containing the communication device. Although this approach facilitates expedient call set-up because the system controller always knows the service coverage area within which a particular communication device is located, the approach requires substantial inbound signaling on the control channel to maintain location reporting accuracy to within a base site's service coverage area. Excessive inbound control channel activity results in inefficient use of both the control channel and system controller resources that are necessary to process the abundance of registration messages. Due to its excessive inbound control channel activity, coverage area tracking is generally used only when tracking a communication device that is actively participating in a communication.

Another known approach to tracking communication device movement is known as the location area update approach. The location area update approach requires a communication device to report, or register, each time the communication device enters a different so-called paging location area. A paging location area typically comprises multiple base site service coverage areas and, accordingly, is serviced by multiple base sites. With this approach, the communication device monitors the system control channel to obtain the identification of the location area containing the communication device. Upon observing a change in the location area identification on the control channel, the communication device transmits an inbound message on the control channel to register with the system controller in the new location area. Since the number of location areas is generally less than the number of service coverage areas, the communication device registers proportionately less with the location area update approach than with the coverage area update approach. Thus, the location area update approach involves substantially less inbound control channel activity than does the coverage area update approach.

With location area tracking, when a communication arrives at the system controller for a particular communication device, the system controller pages the communication device from all the base sites serving the location area containing the communication device. Upon receiving an acknowledgment of the page from the communication device, the system controller transmits the communication to the communication device via the base site that received the acknowledgment. Thus, although the location area update approach reduces the amount of inbound control channel activity as compared with the coverage area update approach, the location area update approach increases the amount of outbound control channel activity. Due to its excessive amount of outbound control channel activity, location area tracking is generally used only when tracking a communication device that is not actively participating in a communication.

Packet data communications are becoming more popular in trunked radio communication systems. The nature of packet data communications is such that a single communication is comprised of multiple data packets. In addition, the various data protocols utilized in the wireline packet routing network (e.g., the Internet) to convey the data packets often causes groups of packets of the communication to arrive at the system controller at different times. Thus, in many circumstances, the system controller must contact the communication device more than one time to provide the communication to the communication device.

Because a packet data communication is generally a one-way communication, a communication device is considered to be actively participating in a communication only during the time when either the data packets are being delivered to the communication device or the communication device is transmitting its data packets. When the communication device is awaiting additional packets to complete the communication, the communication device is not considered to be actively participating in the communication. Therefore, when the system controller is transmitting data packets to the communication device, the communication device utilizes coverage area tracking; whereas, when the system controller is awaiting more data packets to the complete the communication, the communication device utilizes location area tracking. Consequently, the system controller must page the communication device on more than once occasion to deliver a single packet data communication. The subsequent number of pages undesirably increases the amount of outbound control channel activity per communication.

Therefore, a need exists for a method of providing packet data communications to a communication device in a radio communication system that efficiently utilizes inbound and outbound control channel resources.

DESCRIPTION OF A PREFERRED EMBODIMENT

Generally, the present invention provides a method for providing communications to a communication device in a radio communication system. The communication system includes a plurality of base sites coupled to a system controller. Each base site serves a respective service coverage area and the service coverage areas a grouped into a plurality of location areas. At some particular time (e.g., upon traveling from one location area into another location area), the communication device transmits a registration message to the system controller via a first, or serving, base site. Upon receiving the registration message, the system controller affiliates the communication device with the first base site and a first location area that includes the service coverage area of the first base site.

When the system controller receives a communication (e.g., a packet data communication) for the communication device, the system controller determines whether the communication was received within a predetermined period of time after a previous packet data communication involving the communication device. When the communication was received within this predetermined period of time, the system controller transmits at least a portion of the communication (e.g., a group of data packets) to the communication device via the first base site. However, when the communication was received subsequent to the predetermined period of time, the system controller transmits a page to the communication device via the base sites serving the first location area to inform the communication device of the awaiting communication. Upon receiving an acknowledgment of the page, the system controller transmits the communication, or a portion thereof, to the communication device via the base site that received the acknowledgment.

By providing a packet data communication to the communication device in this manner, the present invention substantially reduces the amount of control channel activity (paging) normally associated with delivering such a communication by presuming that the communication device has not moved out of the service coverage area of the first base site for a predetermined amount of time after the communication device's involvement in a previous communication. Such a presumption is generally valid for packet data communications since users of devices that transmit and receive data packets, such as wireless data terminals, often remain stationary, or at least within the same service coverage area, for long enough periods of time to receive multiple independent transmissions of data packets or groups of data packets.

Figure 1:
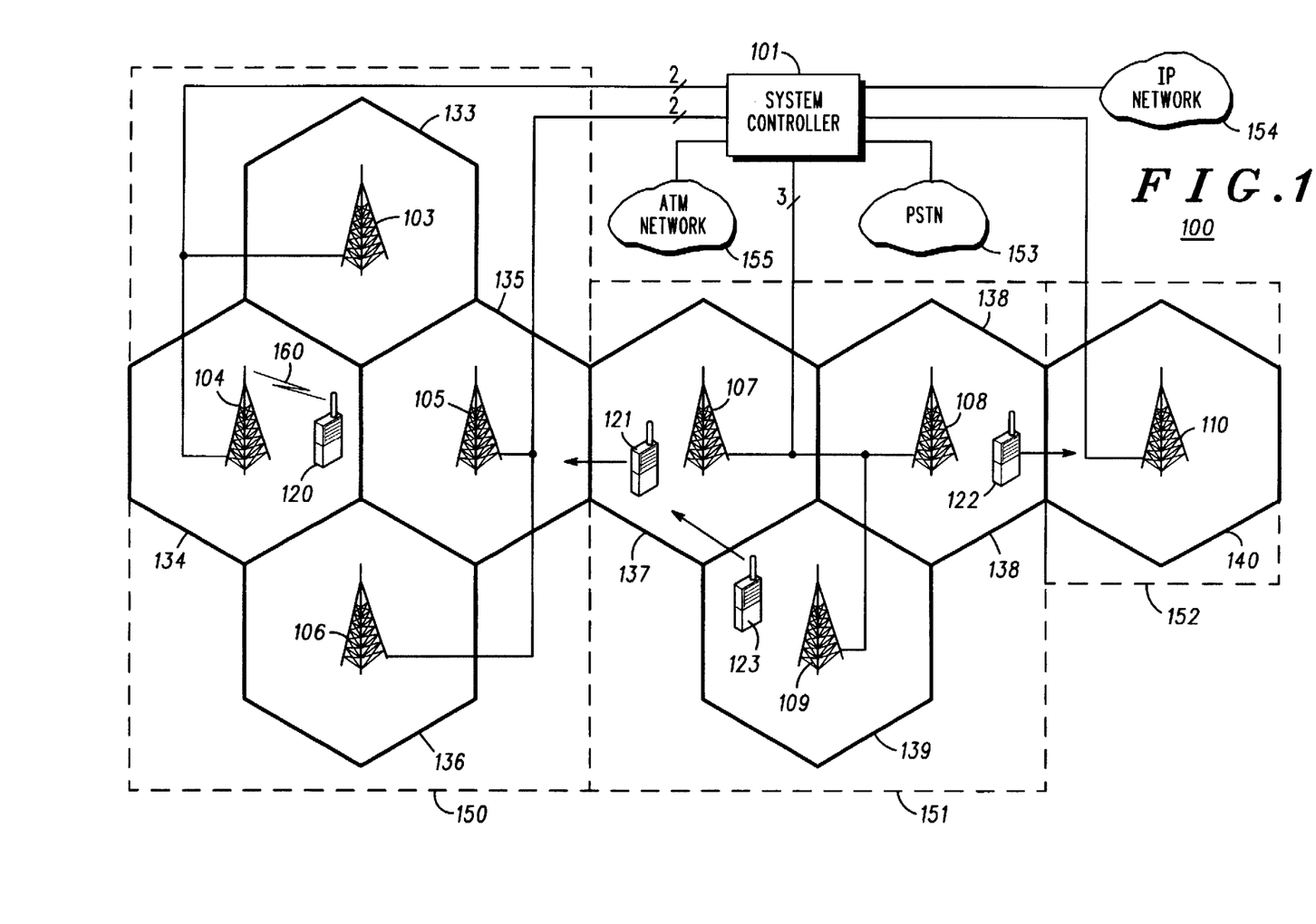
FIG. 1 illustrates a block diagram of an exemplary radio communication system that may beneficially employ the present invention.

The present invention can be more fully understood with reference to FIGS. 1–6. FIG. 1 illustrates a block diagram of an exemplary radio communication system 100 that may beneficially employ the present invention. The radio communication system 100 includes a system controller 101, a plurality of base sites 103–110, and a plurality of communication devices 120–123. Each base site 103–110 provides communication service to (i.e., serves) a corresponding service coverage area 133–140. The base site service coverage areas 133–140 are grouped into one or more location areas 150–152 (three shown). Thus, each location area 150–152 includes one or more of the base site service coverage areas 133–140 and, accordingly, one or more of the base sites 103–110. The base sites 103–110 are coupled to the system controller 101 via respective communication links, such as T1 wireline, fiber optic, or microwave links.

In a preferred embodiment, the radio communication system 100 comprises a trunked radio communication system, such as the "iDEN" platform that is commercially available from Motorola, Inc. The system controller 101 preferably comprises an "iDEN" Base Site Controller together with a packet data router. The base sites 103–110 preferably support one or more trunking communication platforms, such as frequency division multiple access (FDMA), time division multiple access (TDMA), or code division multiple access (CDMA). In the preferred embodiment, the base sites 103–110 comprise "iDEN" Enhanced Base Transceiver Sites. The communication devices 120–123 preferably comprise any wireless devices, such as wireless data terminals, radios, or radiotelephones, that are capable of receiving and transmitting (transceiving) data packets.

Figure 2:
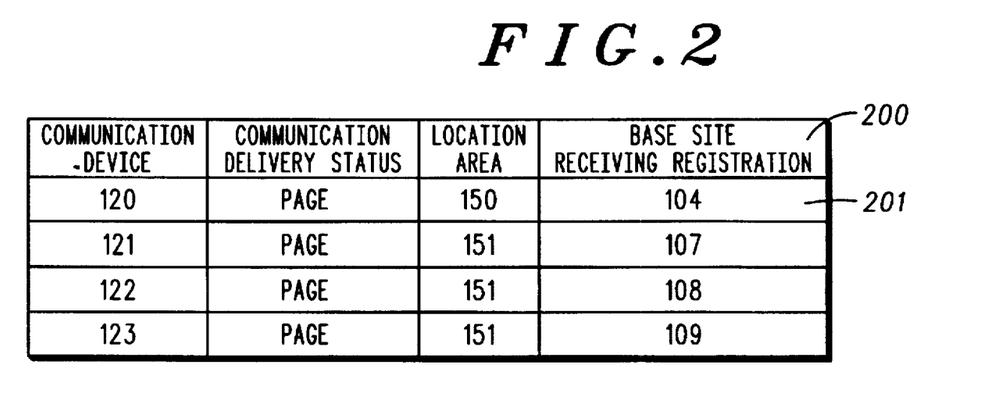
FIG. 2 illustrates an initial registration and communication delivery table in accordance with the present invention.

Operation of the radio communication system 100 occurs substantially as follows in accordance with the present invention. When each communication device 120–123 is initially activated, it registers with the system controller 101 by first identifying a serving base site from control channel transmissions of all the base sites 103–110, as is well-known in the art, and then transmitting a registration message to the system controller 101 via the identified serving base site. Upon receiving the registrations, the system controller 101 affiliates each communication device 120–123 with its serving base site and the location area that includes the service coverage area of the serving base site. The system controller 101 then stores the registrations in a registration and communication delivery lookup table located in the system controller's random access memory (RAM). An exemplary, initial registration and communication delivery table 200 is illustrated in FIG. 2. For the purposes of this discussion, it is assumed that communication unit 120 registers initially via base site 104, communication unit 121 registers initially via base site 107, communication unit 122 registers initially via base site 108, and communication unit 123 registers initially via base site 109. The communication delivery status of each initially registered communication device is set to require paging of the communication device in the event that the system controller 101 receives a packet data communication for the communication device. The association of each communication device 120–123 with its respective communication delivery status, location area, and serving base site is provided by the entries 201 in the initial registration and communication delivery table 200.

When the system controller 101 receives a packet data communication for one of the communication devices (e.g., 120) from some other entity, such as another one of the communication devices (e.g., 121), a subscriber to the public switched telephone network (PSTN) 153, a subscriber to the Internet Protocol (IP) network 154, or a subscriber to an asynchronous transfer mode (ATM) network 155, the system controller 101 consults the communication delivery status in the table entry 201 associated with the receiving, or target, communication device 120 to determine the procedure for communicating the communication to the target communication device 120. When the communication is the first communication involving the target communication device 120, the system controller 101 pages the target communication device 120 from the base sites 103–106 in the location area 150 associated with the target communication device 120. The page informs the communication device 120 that the system controller 101 has received a communication for the communication device 120. Upon receiving the page, the target communication device 120 transmits an acknowledgment of the page to the system controller 101 via the base site (e.g., 104) serving the coverage area 134 containing the communication device 120. Responsive to the acknowledgment, the system controller 101 transmits the communication, or a portion thereof, to the target communication unit 120 via a radio frequency (RF) communication resource, or channel 160, assigned to the base site 104 that received the acknowledgment. For example, if the communication consisted of 100 data packets, the system controller 101 might transmit all 100 packets or only a portion of the 100 packets (e.g., 75 packets) depending on respective system constraints, such as time constraints for packet data transmissions to any one communication device via an RF channel 160.

In addition, the system controller 101 transmits a control message—either together with, or subsequent to, the communication—to the target communication device 120 via the base site 104 that received the acknowledgment to instruct the communication device 120 to transmit supplemental registration messages to the system controller 101 every time the communication device 120 enters a new service coverage area during a predetermined period of time (e.g., five minutes after receipt of the instruction). By requiring the communication device 120 to transmit supplemental registration messages in this manner, the system controller 101 can track the location of the target communication device 120 on a coverage area-by-coverage area basis for the predetermined period of time in anticipation that the system controller 101 will receive another communication during the predetermined period of time for the target communication device 120 or that the system controller 101 will be able to deliver another portion of the present communication to the communication device 120 within the predetermined period of time. By tracking the location of the communication device 120 on a coverage area-by-coverage area basis for the predetermined time period, the system controller 101 can directly deliver the subsequently received communication, or the subsequent portion of the present communication, to the target communication device 120 without having to first page the communication device 120 in its location area 150 (i.e., without having to utilize outbound (base site to communication device) communication resources at each base site 103–106 in the location area 150.

If the predetermined period of time expires before the communication device 120 receives another communication or another portion of the present communication, the communication device 120 preferably automatically reverts to location area tracking and transmits supplemental registration messages to the system controller 101 each time the communication device 120 enters a new location area (e.g., 151).

A benefit of the present invention is apparent in packet data transmissions where several packet transmissions may be necessary to completely deliver a message and where such transmissions may be made at several second or several minute intervals. Although, with the present invention, the communication device may have to transmit a few supplemental registration messages on inbound (communication device to base site) control channels as the communication device travels into new service coverage areas during the time period of the intermittent packet transmissions, the number of supplemental registration messages transmitted during the time period is substantially less than the number of outbound pages that would be required in existing location area tracking techniques that are used while the communication device is idle (i.e., not transmitting or receiving information). For example, in a typical location area that contains 30 or more base site service coverage areas, a packet data communication that requires three separately distinct transmissions also requires 90 or more control channel pages in existing trunked communication systems since communication devices are tracked on a location area-by-location area basis while the communication devices are idle or inactive (e.g., while awaiting one of the intermittent transmissions). By contrast, with the present invention, at most 30 pages are necessary to locate the communication device for the first transmission and no pages are necessary for the second and third transmissions, provided the time separations between the first and second transmissions and between the second and third transmissions are each within the predetermined period of time.

Figure 3:
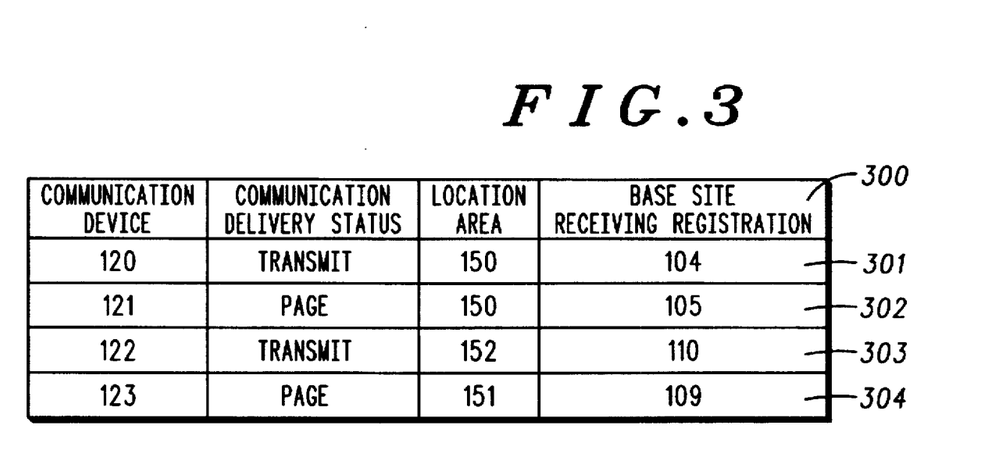
FIG. 3 illustrates an updated registration and communication delivery table in accordance with the present invention.

In a manner similar to that at the communication device 120, the system controller 101 starts its timer after transmission of a communication, or portion thereof, to the communication device 120. Additionally, the system controller 101 changes the communication delivery status portion of the entry 201 for the communication device 120 in the registration and communication delivery table 200 to reflect the change in communication delivery status. Such a change is reflected in the communication device's entry 301 in the updated registration and communication delivery table 300 depicted in FIG. 3. FIG. 3 also depicts exemplary table entry updates for the other communication units 121–123. For example, entry 302 depicts the case where idle communication device 121 has traveled into location area 150 while using location area tracking (i.e., either after its coverage area tracking time period has expired or before its coverage area tracking time period ever started). Entry 303 depicts the case where communication device 122 has traveled into service coverage area 140 during its coverage area tracking time period. Finally, entry 304 depicts the case where communication device 123 has traveled into service coverage area 137 while using location area tracking. In this last case, the entry 304 for communication device 123 in table 300 is identical to the corresponding entry in table 200 because the entry in table 300 is only updated when communication device 123 enters a new location area.

When the system controller 101 is unable to provide the communication device 120 with another communication or portion of a communication within the predetermined period of time (e.g., due to the unavailability of a communication channel 160 at the serving base site 104 or due to no other communication being received for the communication device 120), the system controller 101 automatically changes the communication delivery status portion of the entry 301 for the communication device 120 in the updated registration and communication delivery table 300 to reflect the necessity to page the communication device 120 prior to the next transmission. In addition, when the communication device 120 is not configured to automatically revert to location area registration after expiration of the predetermined period of time, the system controller 101 transmits a control message to the communication device 120 instructing the communication device 120 to revert to location area registration (i.e., instructing the communication device 120 to transmit supplemental registration messages upon entering each new location area).

In addition to a fixed predetermined period of time, other thresholds may be established to determine when a communication device should register with the system controller 101 in order to reduce the amount of control channel activity (inbound or outbound) in accordance with various embodiments of the present invention. For example, in one embodiment, the system controller 101 might count the number of supplemental registration messages received from a communication device when the communication device is in coverage area tracking (i.e., transmitting supplemental registration messages upon entering each new service coverage area) and, when the number of received supplemental registration messages exceeds a predetermined number within a certain period of time (e.g., 10 minutes), the system controller 101 might transmit a control message to the communication device via the base site that received the most recent supplemental registration message to instruct the communication device to transmit supplemental registration messages upon entering each new location area.

In another embodiment, the system controller 101 might not only count the number of supplemental registrations received from a communication device within a certain period of time while the communication device is in coverage area tracking, but might also estimate the number of pages that would have been transmitted to the communication device during the certain period of time had the communication device been in location area tracking. The system controller 101 estimates the number of pages by determining the number of pages that would have been transmitted had the communication device been in location area tracking instead of coverage area tracking and had the system controller received a communication for the communication device. For example, if the system controller 101 received eight supplemental registrations from the communication device in a ten minute time frame and only four base sites would have had to have been used to page the communication device in the same ten minute time frame (e.g., if the communication device 120 traveled in a circle through the service coverage areas 133–136 of location area 150 twice), the system controller 101 would determine that the number of registration messages (eight) exceeds the estimated number of pages—in this case, four (one from each base site 103–106). When the number of registration messages exceeds the estimated number of pages, the system controller transmits a control message to the communication device via the base site that received the most recent supplemental registration message to instruct the communication device to transmit supplemental registration messages upon entering each new location area.

In yet another embodiment, the fixed predetermined period of time is dependent upon whether the previous communication involving the communication device included a transmission by the communication device. For example, the predetermined period of time for coverage area based registration might be longer when the communication device performed a transmission during the previous communication than when the communication device acted only as a receiver of the previous communication. Such a distinction between predetermined time periods might be desired to accommodate two-way communications, which often require longer time periods for response than do one-way communications, such as data transfers.

In further embodiments, the communication device might determine for itself when to transmit supplemental registration messages to substantially reduce the overall control channel activity associated with receiving a communication. For example, in one embodiment, the communication device might compute the length of time that it remains in each base site's service coverage area. When the communication device has remained in a base site's service coverage area for a particular length of time and the communication device is currently in location area tracking (i.e., being paged by the system controller 101 prior to delivery of any communication), the communication device transmits a control message to the system controller 101 that informs the system controller 101 of the base site service coverage area within which the communication device is currently located and that the communication device will transmit supplemental registration messages upon entering base site service coverage areas (i.e., will convert to coverage area tracking). The communication device then transmits a supplemental registration message upon entering each new service coverage area. Thus, in this embodiment, the communication device realizes that it is remaining in one base site service coverage area while being idle and, therefore, eliminates multiple future outbound control channel messages (pages) by transmitting a single inbound control channel message to provide a substantial net reduction in control channel traffic.

In another embodiment, the communication device determines how frequently it converts from coverage area tracking to location area tracking and back again while the communication device remains in the same location area. This determination is accomplished by determining whether the number of pages received at intervals exceeding the predetermined time period associated with remaining in coverage area tracking exceeds a predetermined number. When the number of such pages exceeds the predetermined number (i.e., there has been an abundance of tracking type conversions), the communication device transmits a control message to the system controller 101 that informs the system controller 101 of the base site service coverage area within which the communication device is currently located and that the communication device will transmit supplemental registration messages upon entering base site service coverage areas (i.e., will convert to coverage area tracking). The communication device then transmits a supplemental registration message upon entering each new service coverage area. Thus, in this embodiment, the communication device realizes that its communication pattern is such that it will be paged often and, therefore, informs the system controller 101 that it will convert to coverage area tracking to substantially reduce the net amount of control channel traffic (inbound and outbound).

The above embodiments may be utilized separate from, or in combination with, the utilization of a fixed predetermined period of time to determine the supplemental registration procedure of a communication device. The supplemental registration procedure, in effect, determines the delivery procedure of a communication received by the system controller 101 that is destined for a target communication device. When the supplemental registration procedure is on a coverage area-by-coverage area basis, the system controller 101 transmits the received communication or portion thereof directly to the communication device. However, when the supplemental registration procedure is on a location area-by-location area basis, the system controller 101 first transmits a page to the communication device via the base sites serving the location area containing the communication device and, upon receipt of an acknowledgment of the page from the communication device, transmits the communication to the communication device via the base site that received the page.

Although described above primarily with regard to packet data applications, the present invention also has applicability to circuit-switched communications, such as voice transmissions. For example, if a communication device calls a telephone subscriber that has voice mail and the voice mail answers the call after one ring (as is often the case when the called party is already on the telephone), the system controller 101 might instruct the calling communication device to use coverage area tracking for a certain amount of time after termination of the call due to the high probability that the called telephone subscriber will call the communication device back.

Figure 4A:
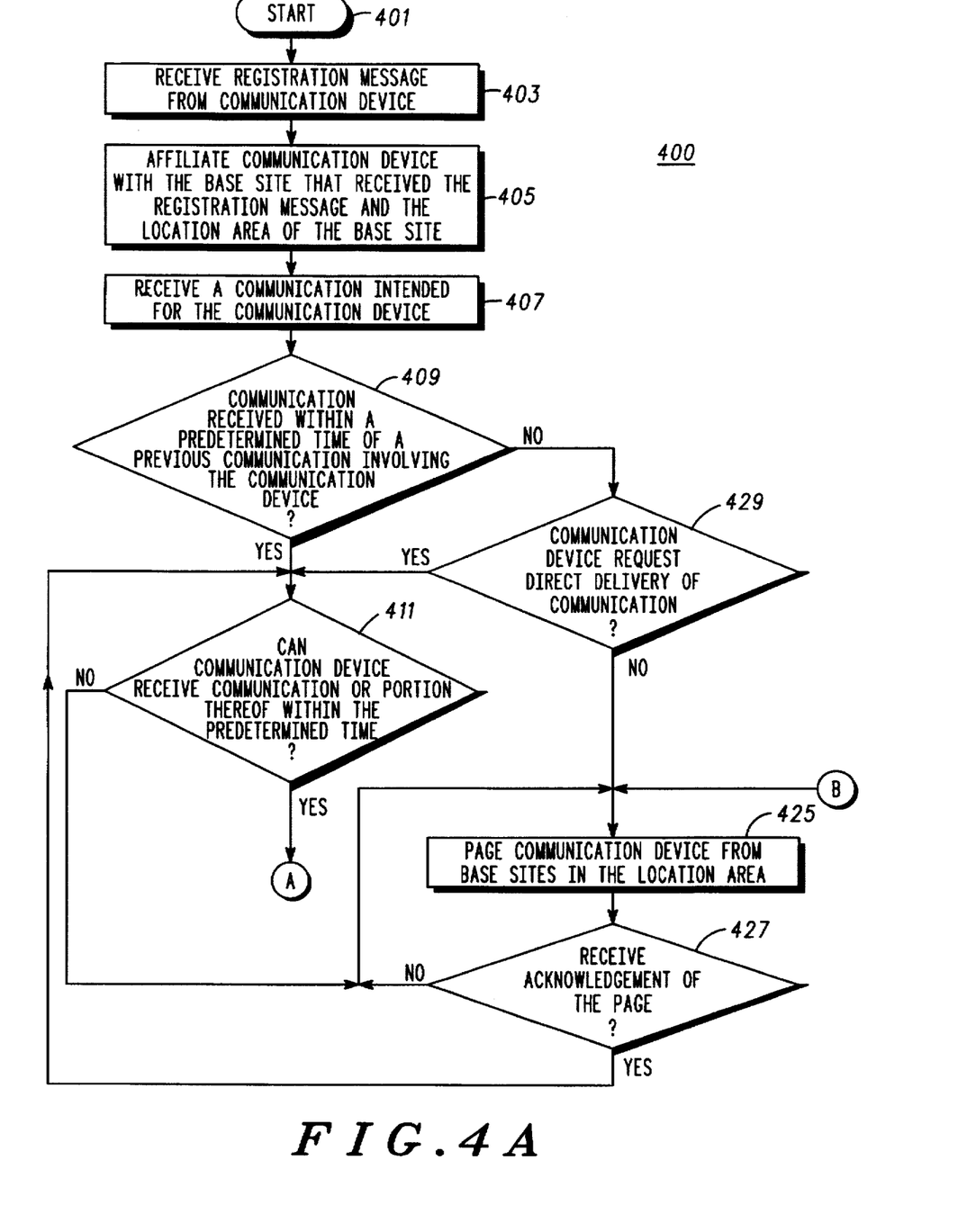
FIGS. 4A and 4B illustrate a logic flow diagram of steps executed by a system controller to provide a packet data communication to a communication device in accordance with a preferred embodiment of the present invention.
Figure 4B:
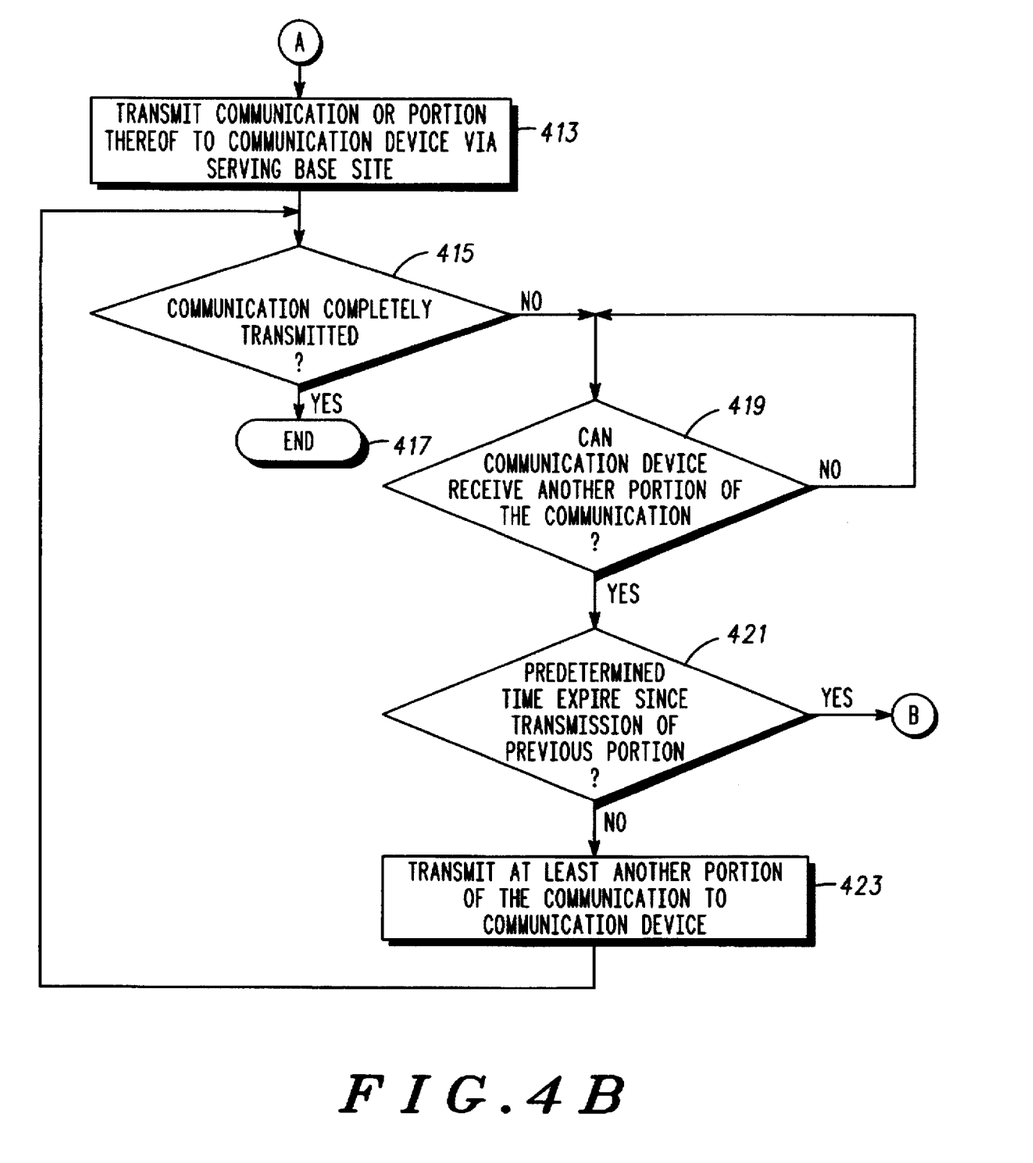

FIGS. 4A and 4B illustrate a logic flow diagram 400 of steps executed by a system controller to provide a packet data communication to a communication device in accordance with a preferred embodiment of the present invention. The logic flow begins (401) when the system controller receives (403) a registration message from the communication device via a base site (e.g., when the communication device enters a new location area or a new base site service coverage area depending on the current tracking mode). The system controller affiliates (405) the communication device with the base site that received the registration message and the location area containing the base site. The system controller then receives (407) a packet data communication or a portion thereof (e.g., a group of packets of a longer data message) intended for the communication device.

Prior to delivering the communication, or portion thereof, the system controller determines (409) whether the communication was received within a predetermined period of time of a previous communication involving the communication device. The previous communication involving the communication device is a communication in which the communication device either received the communication, transmitted the communication, or participated in both receiving and transmitting the communication. When the communication was received at the system controller within the predetermined period of time of the previous communication, the system controller determines (411) whether the communication device can receive the communication or a portion thereof. The communication device can receive the communication or portion thereof when an RF traffic channel is available at the base site that received the communication device's registration (the serving base site).

When the communication device can receive the communication, the system controller transmits (413) the communication or a portion thereof to the communication device via the serving base site and then determines (415) whether the communication has been completely transmitted. The communication has been completely transmitted when the system controller has transmitted the complete communication, as opposed to only a portion of the communication, to the communication device. As noted above with respect to FIG. 1, the system controller may be able to transmit only a portion of the received communication either because only a portion of the communication has been received or because system constraints on RF channel usage are not sufficient to permit transmission of the complete communication during one transaction. Once the communication has been completely transmitted, the logic flow ends (417).

However, when the transmission is not complete, the system controller determines (419) whether the communication device can receive another portion of the communication (i.e., whether a traffic channel is available at the base site that received the most recent communication device registration). When the communication device can receive another portion of the communication, the system controller determines (421) whether the predetermined period of time has expired since transmission of the previous portion of the communication. When the predetermined period of time has not expired, the system controller transmits (423) at least another portion of the communication to the communication device and again determines (415) whether the communication has been completely transmitted.

When the predetermined period of time has expired or the communication device cannot receive the communication (409), the system controller pages (425) the communication device from the base sites in the location area from which the communication device last registered. After paging the communication device, the system controller determines (427) whether the it has received an acknowledgment of the page. If no acknowledgment is received within a certain period of time, the system controller re-pages (425) the communication device. However, if an acknowledgment is received within a certain period of time, the logic flow continues at decision block 411 where the system controller determines whether the communication device can receive the communication or a portion thereof (e.g., determines whether the base site that received the acknowledgment has an available RF traffic channel). When the communication device can receive the communication or communication portion, the system controller transmits (413) the communication or communication portion to the communication device via the currently serving base site (i.e., the base site that received the page acknowledgment or a base site that received a most recent registration) and the logic flow continues at decision block 415.

Referring back to decision block 409, when the communication was not received (409) at the system controller within the predetermined period of time of the previous communication, the system controller determines (429) whether the communication device has requested direct delivery of the communication. In the preferred embodiment, the communication device requests direct delivery of the communication by transmitting a control message to the system controller that informs the system controller that the communication device is converting from location area tracking to coverage area tracking (e.g., due to remaining in the same base site service coverage area for a certain length of time). When the system controller determines that the communication device has requested direct delivery of the communication, the logic flow continues at decision block 411 where the system controller determines whether the communication device can receive the communication or a portion thereof (e.g., determines whether the base site that received the control message has an available RF traffic channel). When the system controller determines that the communication device has not requested direct delivery of the communication, the logic flow continues at block 425 where the system controller pages the communication device.

Figure 5A:
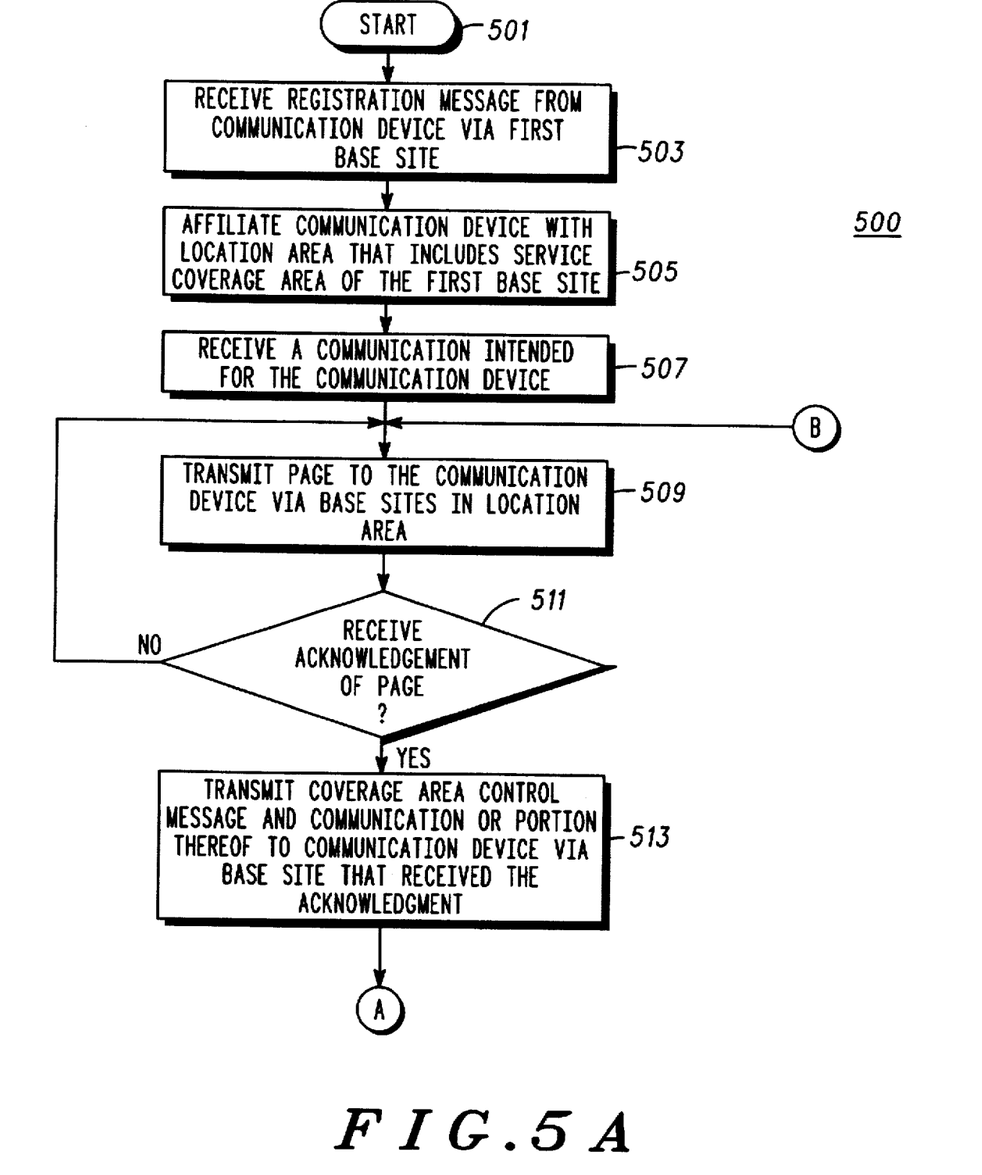
FIGS. 5A and 5B illustrate a logic flow diagram of steps executed by a system controller to provide a packet data communication to a communication device in accordance with an alternative embodiment of the present invention.
Figure 5B:
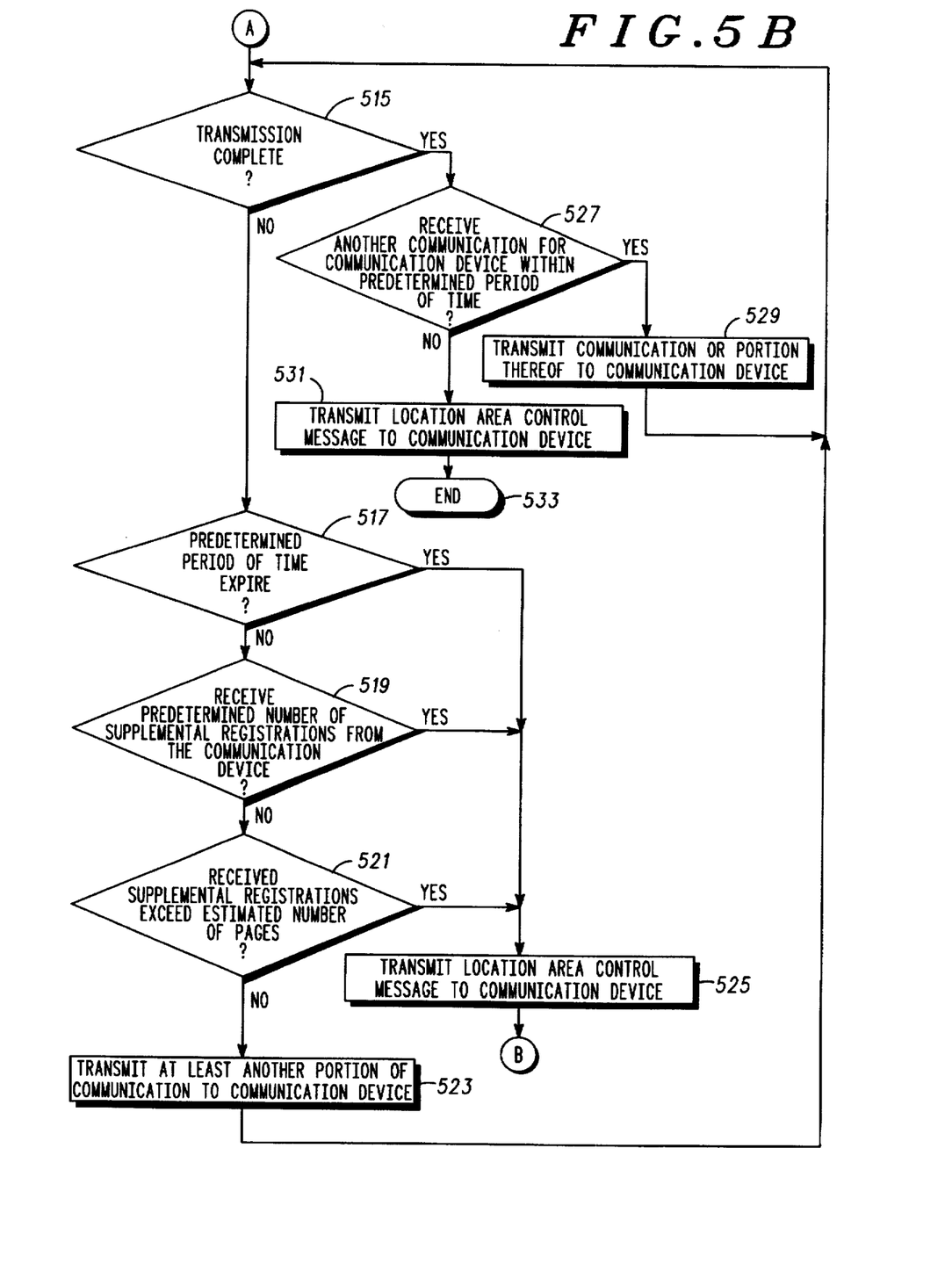

FIGS. 5A and 5B illustrate a logic flow diagram 500 of steps executed by a system controller to provide a communication to a communication device in accordance with an alternative embodiment of the present invention. The logic flow begins (501) when the system controller receives (503) a registration message from the communication device via a first base site (e.g., when the communication device enters a new location area). The system controller affiliates (505) the communication device with the first base site and the location area containing the service coverage area of the first base site. Upon receiving (507) a communication intended for the communication device, the system controller pages (509) the communication device from the base sites serving the location area containing the first base site. After sending the page, the system controller determines (511) whether it received an acknowledgment of the page within a certain period of time. If no acknowledgment is received, the system controller re-pages (509) the communication device.

If an acknowledgment is received, the system controller transmits (513) a coverage area control message and the communication, or a portion thereof, to the communication device via the base site that received the acknowledgment. The coverage area control message instructs the communication device to transmit supplemental registration messages each time the communication device enters a base site service coverage area during a predetermined period of time (e.g., the 5 minute period after receipt of the control message). Upon transmitting the communication, the system controller determines (515) whether the communication has been completely transmitted. When the communication has not been completely transmitted, the system controller determines (517) whether the predetermined period of time has expired before the system controller is able (e.g., due to traffic channel availability constraints) to transmit at least another portion of the communication to the communication device When the predetermined period of time has not expired, the communication device remains in coverage area tracking and the system controller determines (519) whether it has received a predetermined number of supplemental registration messages from the communication device. When the predetermined period of time has not expired and the number of received supplemental registration messages is less than the predetermined number, the system controller determines (521) whether the number of received supplemental registration messages exceeds the estimated number of pages that would have been transmitted had the system controller been able to transmit another portion of the communication.

When the three conditions of decision blocks 517, 519, and 521 are answered in the negative, the communication device is still in coverage area tracking and the system controller transmits (523) at least another portion of the communication to the communication device, provided a traffic channel is then available. It should be noted that the time period for remaining in coverage area tracking resets upon the transmission of each communication portion. That is, after the system controller transmits (513) the first portion of the communication (e.g., a first group of data packets), the communication device transmits supplemental registration messages upon entering base site service coverage areas for a period of time (e.g., five minutes). Similarly, after the system controller transmits (523) the second portion of the communication (e.g., a second group of data packets), the communication device also transmits supplemental registration messages upon entering base site service coverage areas for the same period of time (i.e., five minutes), or for a different period of time (e.g., 10 minutes).

Upon transmitting (523) another portion of the communication, the system controller again determines (515) whether the communication has been completely transmitted. When the communication has been completely transmitted, the system controller determines (527) whether it received another communication for the communication device within a predetermined period of time of the most recent transmission. When the system controller has received another communication for the communication device within such a time, the system controller transmits (529) the new communication, or a portion thereof, to the communication device and the logic flow continues at decision block 515. When the system controller has not received another communication for the communication device within such a time, the system controller transmits (531) a location area control message to the communication device and the logic flow ends (533). The location area control message instructs the communication device to transmit supplemental registration messages each time the communication device enters a location area.

Referring back to decision block 515, when the initial communication has not been completely transmitted (515) and any one or more of the three conditions of decision blocks 517, 519, and 521 are answered in the affirmative, the system controller transmits (525) the location area control message to the communication device and the logic flow continues at block 509, where the system controller transmits a page to the communication device when the system controller is finally able (e.g., due to the availability of a traffic channel or the receipt of the another portion of the communication) to transmit an additional portion of the communication to the communication device.

Figure 6:
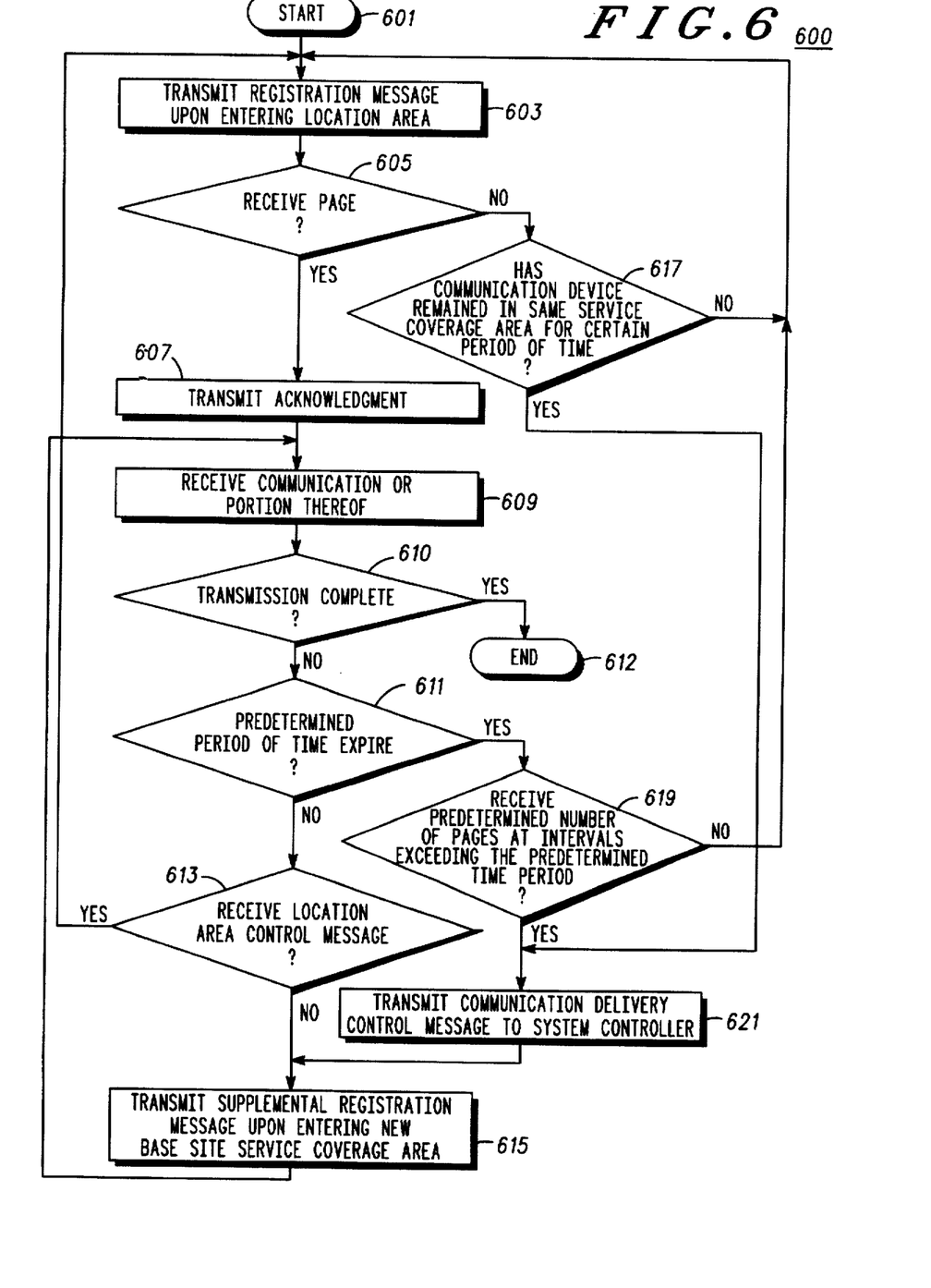
FIG. 6 illustrates a logic flow diagram of steps executed by a communication device to receive a packet data communication in accordance with the present invention.

FIG. 6 illustrates a logic flow diagram 600 of steps executed by a communication device to receive a communication in accordance with the present invention. The logic flow begins (601) when the communication device transmits (603) a registration message to the system controller upon entering a location area of the communication system. Upon registering with the system controller, the communication device determines (605) whether it has received a page from the system controller via a base site in the location area. When a page has been received, the communication device converts to coverage area tracking and transmits (607) an acknowledgment of the page to the system controller via the base site serving the service coverage area within which the communication device is currently located.

Subsequent to transmitting the acknowledgment, the communication device receives (609) a communication, or a portion thereof, from the system controller. The communication device then determines (610) whether the communication has been completely transmitted—e.g., as indicated by an end of communication flag. When the communication has been completely transmitted, the logic flow ends (612). However, when the communication has not been completely transmitted, the communication device determines (611) whether a predetermined period of time has expired since receipt of the page. When the predetermined period of time has not expired, the communication device determines (613) whether it received a location area control message from the system controller instructing the communication device to transmit supplemental registration messages upon entering each location area. When the communication device has received the location area control message, the communication device transmits (603) a registration message upon entering a new location area and the logic flow continues at decision block 605. However, when the communication device has not received the location area control message and the predetermined period of time has not expired, the communication device transmits (615) a supplemental registration message upon entering a new base site service coverage area and the logic flow continues at block 609, where the communication receives the next portion of the communication.

When the communication has not been completely transmitted and the predetermined period of time has expired, the communication device determines (619) whether it has received a predetermined number of pages at intervals exceeding the predetermined period of time associated with remaining in coverage area tracking (i.e., the communication device determines whether it is being paged often enough to justify remaining in coverage area tracking even though the predetermined time period has expired). When the communication device has not received the predetermined number of pages, the communication device converts to location area tracking and the logic flow continues at block 603. However, when the communication device has received the predetermined number of pages, the communication device transmits (621) a communication delivery control message to the system controller informing the system controller that the communication device is going to remain in coverage area tracking, even though the predetermined period of time has expired, and the logic flow continues at block 615.

When, in decision block 605, the communication device has not received a page, the communication device determines (617) whether the communication device has remained in the same base site service coverage area for a certain period of time. The communication device preferably makes this determination by starting a timer upon entering each base site service coverage area. In accordance with well-known techniques, the communication device determines that it has entered a new base site service coverage area by detecting the base site identifier associated with the control channel having the strongest signal or best signal quality of the received control channels and comparing the received base site identifier with the previously detected base site identifier to detect a change. When the communication device has remained in the same base site service coverage area for a certain period of time, the communication device transmits (621) the communication delivery control message to the system controller informing the system controller that the communication device is going to convert to coverage area tracking and the logic flow continues at block 615. However, when the communication device has not remained in the same base site service coverage area for a certain period of time, the communication device remains in location area tracking and the logic flow continues at block 603.

The present invention provides a method for providing packet data communications to a communication device in a radio communication system. With this invention, the overall amount of control channel activity (i.e., inbound and outbound) associated with delivering a communication to a communication device is substantially reduced as compared to existing techniques. The present invention reduces the net amount of control channel activity by tracking the communication device on a location area basis when the communication device is neither currently involved in, nor has been recently involved in, a communication and by tracking the communication device on a base site coverage area basis when the communication device is currently involved in a communication or is not currently involved in a communication, but has been recently involved in a communication. The present invention further reduces the net amount of control channel activity by tracking the communication device on a base site coverage area basis when the communication device is not currently involved in a communication, but has remained in a base site service coverage area for long period of time or has received an excessive number of pages. The present invention reduces the net amount of control channel activity still further by tracking the communication device on a location area basis when the communication device is not currently involved in a communication, but has transmitted an excessive number of registrations. By reducing the control channel activity associated with delivering a communication, the present invention permits a reduction of control channel resources as compared to existing tracking techniques, thereby allowing some control channel resources to be converted to traffic channel resources to facilitate data packet transmissions.

While the present invention has been particularly shown and described with reference to particular embodiments thereof, it will be understood by those skilled in the art that various changes in form and details may be made therein without departing from the spirit and scope of the present invention.

I claim:

1. In a communication system that includes a system controller, a plurality of base sites, and a communication device, the plurality of base sites serving respective service coverage areas, the service coverage areas being grouped into a plurality of location areas, a method for the system controller to provide packet data communications to the communication device, the method comprising the steps of:

a) receiving a registration message from the communication device via a first base site of the plurality of base sites;

b) affiliating the communication device with the first base site and a first location area of the plurality of location areas that includes a service coverage area of the first base site;

c) receiving a packet data communication intended for the communication device to produce a received communication;

d) determining whether the received communication was received within a first predetermined period of time after a previous packet data communication involving the communication device; and e) when the received communication was received within the first predetermined period of time, transmitting at least a first portion of the received communication to the communication device via the first base site.

2. The method of claim 1, further comprising the step of:

f) when the received communication was received subsequent to the first predetermined period of time, transmitting a page to the communication device via at least one base site serving the first location area, the page informing the communication device of the received communication.

3. The method of claim 2, further comprising the steps of:

g) receiving an acknowledgment of the page from the communication device via a second base site of the at least one base site; and h) transmitting, responsive to the acknowledgment, at least a portion of the received communication to the communication device via the second base site.

4. The method of claim 3, wherein the second base site is the first base site.

5. The method of claim 1, further comprising the steps of:

f) determining whether the communication device can receive at least a second portion of the received communication;

g) when the communication device can receive the at least a second portion of the received communication, determining whether the first predetermined period of time has expired since transmission of the at least a first portion of the received communication;

h) when the first predetermined period of time has not expired since transmission of the at least a first portion of the received communication, transmitting the at least a second portion of the received communication to the first communication device via the first base site;

i) when the first predetermined period of time has expired since transmission of the at least a first portion of the received communication, 1) determining a location area of the plurality of location areas that contains the first communication device;

2) transmitting a page to the communication device from at least one base site serving the location area containing the first communication device, the page informing the communication device of the received communication;

3) receiving an acknowledgment of the page from the communication device via a base site of the at least one base site serving the location area containing the first communication device; and 4) transmitting, responsive to the acknowledgment, the at least a second portion of the received communication to the communication device via the base site that received the acknowledgment.

6. The method of claim 5, wherein step (f) comprises the step of determining whether a communication resource is available at the first base site to transmit the at least a second portion of the received communication to the communication device.

7. The method of claim 1, wherein step (d) comprises the step of:

d1) determining whether the received communication was received within a predetermined period of time after a previous packet data communication intended for the communication device.

8. The method of claim 1, wherein step (d) comprises the step of:

d1) determining whether the received communication was received within a predetermined period of time after a previous packet data communication transmitted by the communication device.

9. The method of claim 1, wherein step (d) further comprises the steps of:

d1) determining whether the previous packet data communication was transmitted by the communication device; and d2) when the previous packet data communication was transmitted by the communication device, determining whether the received communication was received within a second predetermined period of time after the previous packet data communication, wherein the second predetermined period of time is greater than the first predetermined period of time;

and wherein step (e) comprises the step of:

e1) when the received communication was received within the second predetermined period of time, transmitting the received communication to the communication device via the first base site.

10. In a communication system that includes a system controller, a plurality of base sites, and a communication device, the plurality of base sites serving respective service coverage areas, the service coverage areas being grouped into a plurality of location areas, a method for the system controller to provide communications to the communication device, the method comprising the steps of:

a) receiving a registration message from the communication device via a first base site of the plurality of base sites;

b) affiliating the communication device with a first location area of the plurality of location areas that includes a service coverage area of the first base site;

c) receiving a communication intended for the communication device to produce a received communication;

d) transmitting a page to the communication device via at least one base site serving the first location area, the page informing the communication device of the received communication;

e) receiving an acknowledgment of the page from the communication device via a base site of the at least one base site; and f) transmitting a control message to the communication device via the base site that received the acknowledgment, the control message instructing the communication device to transmit a supplemental registration message upon entering each base site service coverage area while the communication device is not involved in a communication.

11. The method of claim 10, wherein step (f) further comprises the step of transmitting at least a first portion of the received communication to the communication device via the base site that received the acknowledgment.

12. The method of claim 10, wherein the control message instructs the communication device to transmit the supplemental registration message upon entering each base site service coverage area during a predetermined period of time.

13. The method of claim 12, further comprising the step of transmitting a second control message to the communication device when at least a second portion of the communication is not transmitted to the communication device within the predetermined period of time, the second control message instructing the communication device to transmit a supplemental registration message upon entering each location area of the plurality of location areas.

14. The method of claim 12, further comprising the step of transmitting at least a second portion of the received communication to the communication device via a base site that received a most recent supplemental registration message, wherein transmission of said at least a second portion of the received communication occurs within the predetermined period of time.

15. The method of claim 10, further comprising the steps of:

g) receiving a plurality of supplemental registration messages from the communication device, the plurality of supplemental registration messages including a most recent supplemental registration message received via a second base site;

h) determining whether at least a predetermined number of the plurality of supplemental registration messages was received in a predetermined time period; and i) when at least the predetermined number of the plurality of supplemental registration messages was received in the predetermined time period, transmitting a second control message to the communication device via the second base site, the second control message instructing the communication device to transmit a supplemental registration message upon entering each location area of the plurality of location areas.

16. The method of claim 10, further comprising the steps of:
g) receiving a plurality of supplemental registration messages from the communication device within a predetermined time period, the plurality of supplemental registration messages including a most recent supplemental registration message received via a second base site;
h) determining whether the plurality of supplemental registration messages exceeds an estimated number of pages to be transmitted to the communication device; and
i) when the plurality of supplemental registration messages exceeds the estimated number of pages, transmitting a second control message to the communication device via the second base site, the second control message instructing the communication device to transmit a supplemental registration message upon entering each location area of the plurality of location areas.

17. In a communication system that includes a system controller, a plurality of base sites, and a communication device, the plurality of base sites serving respective base site service coverage areas, the base site service coverage areas being grouped into a plurality of location areas, a method for the communication device to receive communications from the system controller, the method comprising the steps of:
a) transmitting a first registration message to the system controller via a first base site of the plurality of base sites upon entering a first location area of the plurality of location areas;
b) determining whether a first page has been received from the system controller, the first page indicating that the system controller has a communication for the communication device; and
c) when a first page has been received and the communication device is not actively participating in a communication, transmitting a supplemental registration message to the system controller upon entering a base site service coverage area during a first predetermined period of time after receipt of the first page.

18. The method of claim 17, further comprising the steps of:
d) determining whether at least a portion of the communication has been received from the system controller within the first predetermined period of time; and
e) when at least a portion of the communication has not been received within the first predetermined period of time, transmitting a supplemental registration message to the system controller upon entering a location area of the plurality of location areas.

19. The method of claim 18, further comprising the step of transmitting a supplemental registration message to the system controller upon entering a base site service coverage area during a second predetermined period of time when at least a portion of the communication has been received within the first predetermined period of time.

20. The method of claim 19, wherein the second predetermined period of time is equal in length to the first predetermined period of time.

21. The method of claim 17, further comprising the steps of:
d) determining whether at least a predetermined number of pages has been received at intervals exceeding the first predetermined period of time while the communication device remains in the first location area; and
e) when at least the predetermined number of pages has been received, transmitting a supplemental registration message to the system controller upon entering a base site service coverage area.

22. The method of claim 21, further comprising the step of transmitting a control message to the system controller informing the system controller that supplemental registration messages will be sent upon entering base site service coverage areas.

23. The method of claim 17, further comprising the steps of:
d) when a first page has not been received, determining whether the communication device has remained within a base site service coverage area of the first location area for a second predetermined period of time; and
e) when the communication device has remained within a base site service coverage area of the first location area for the second predetermined period of time, transmitting a supplemental registration message to the system controller upon entering another base site service coverage area.

24. The method of claim 23, further comprising the step of transmitting a control message to the system controller informing the system controller that supplemental registration messages will be sent upon entering base site service coverage areas.

25. The method of claim 17, further comprising the steps of:
d) transmitting an acknowledgment of the first page to the system controller via a base site within the first location area; and
e) receiving at least a portion of the communication from the system controller via the base site that received the acknowledgment.

26. The method of claim 17, further comprising the steps of:
d) receiving a control message from the system controller instructing the communication device to transmit a supplemental registration message upon entering a location area of the plurality of location areas during the first predetermined period of time, the control message being responsive to transmissions of a quantity of supplemental registration messages that exceeds a predetermined number; and
e) responsive to the control message, transmitting a supplemental registration message upon entering a location area of the plurality of location areas during the first predetermined period of time.

27. In a communication system that includes a system controller, a plurality of base sites, and a communication device, the plurality of base sites serving respective base site service coverage areas, the base site service coverage areas being grouped into a plurality of location areas, a method for the communication device to receive packet data communications from the system controller, the method comprising the steps of:
a) transmitting a first registration message to the system controller via a first base site of the plurality of base sites upon entering a first location area of the plurality of location areas;

b) receiving a first page from the system controller via at least one base site located in the first location area, the first page indicating that the system controller has a packet data communication for the communication device;

c) transmitting an acknowledgment of the first page to the system controller via a base site of the at least one base site located in the first location area;

d) receiving a first portion of the packet data communication from the system controller via the base site that received the acknowledgment;

e) transmitting supplemental registration messages to the system controller upon entering base site service coverage areas during a first predetermined period of time, the supplemental registration messages including a most recent supplemental registration message; and f) receiving a second portion of the packet data communication from the system controller via a base site that received the most recent supplemental registration message when the second portion of the packet data communication is received during the first predetermined period of time.

28. The method of claim 27, further comprising the step of:

g) when the second portion of the packet data communication is not received during the first predetermined period of time and the first predetermined period of time has expired, transmitting a supplemental registration message to the system controller upon entering a location area of the plurality of location areas.

29. The method of claim 28, further comprising the steps of:

h) receiving a second page from the system controller after expiration of the first predetermined period of time, the second page indicating that the system controller has at least the second portion of the packet data communication for the communication device;

i) transmitting an acknowledgment of the second page to the system controller via a base site;

j) receiving the second portion of the packet data communication from the system controller via the base site that received the acknowledgment of the second page; and k) transmitting supplemental registration messages to the system controller upon entering base site service coverage areas during a second predetermined period of time.

30. The method of claim 28, further comprising the steps of:

h) after expiration of the first predetermined period of time, determining whether the communication device has remained within a base site service coverage area for a second predetermined period of time; and i) when the communication device has remained within the base site service coverage area for the second predetermined period of time, transmitting supplemental registration messages to the system controller upon entering base site service coverage areas.

* * * * *